(12) United States Patent
Bolzoni et al.

(10) Patent No.: US 9,191,398 B2
(45) Date of Patent: Nov. 17, 2015

(54) METHOD AND SYSTEM FOR ALERT CLASSIFICATION IN A COMPUTER NETWORK

(75) Inventors: Damiano Bolzoni, Enschede (NL); Sandro Etalle, Tilburg (NL)

(73) Assignee: Security Matters B.V., Enschede (NL)

( * ) Notice: Subject to any disclaimer, the term of this patent is extended or adjusted under 35 U.S.C. 154(b) by 3 days.

(21) Appl. No.: 13/262,112

(22) PCT Filed: Mar. 31, 2010

(86) PCT No.: PCT/NL2010/000060
§ 371 (c)(1),
(2), (4) Date: Sep. 29, 2011

(87) PCT Pub. No.: WO2010/114363
PCT Pub. Date: Oct. 7, 2010

(65) Prior Publication Data
US 2012/0036577 A1    Feb. 9, 2012

Related U.S. Application Data

(60) Provisional application No. 61/165,565, filed on Apr. 1, 2009.

(30) Foreign Application Priority Data

Apr. 1, 2009 (NL) .................................... 2002694

(51) Int. Cl.
*H04L 29/06* (2006.01)
*H04L 12/26* (2006.01)

(52) U.S. Cl.
CPC ........ *H04L 63/1416* (2013.01); *H04L 12/2602* (2013.01); *H04L 43/00* (2013.01); *H04L 63/1408* (2013.01); *H04L 63/1425* (2013.01)

(58) Field of Classification Search
CPC ............ H04L 63/1416; H04L 63/1408; H04L 63/1425
USPC ......................................................... 726/23
See application file for complete search history.

(56) References Cited

U.S. PATENT DOCUMENTS 7,017,186 B2 * 3/2006 Day .................................. 726/23
7,042,852 B2 * 5/2006 Hrastar ......................... 370/310

(Continued)

OTHER PUBLICATIONS

Anagram: A Content Anomaly Detector Resistant to Mimicry Attack; Ke Wang, Janak J. Parekh, and Salvatore J. Stolfo; RAID 2006, LNCS 4219, pp. 226-248, 2006.*
Anomalous Payload-Based Network Intrusion Detection; Ke Wang and Salvatore J. Stolfo; RAID 2004, LNCS 3224, pp. 203-222, 2004.*

(Continued)

*Primary Examiner* — James Turchen
(74) *Attorney, Agent, or Firm* — Hoffmann & Baron, LLP (57) ABSTRACT

A method and a system for classification of intrusion alerts in computer network is provided. The method comprises the steps of monitoring traffic data in a computer network, detecting an intrusion, providing an intrusion alert and data in relation to the intrusion alert, generating a statistical analysis of the data in relation to the intrusion alert and classifying the intrusion alert based on said statistical analysis. The intrusion alerts and the data in relation to an intrusion alert may be generated by anomaly-based intrusion detection system. The generating a statistical analysis may comprise generating information about a statistical distribution of n-grams in the data. The classification may comprise comparing the statistical analysis with a model analysis of intrusion alerts with predefined alert classes. This model may be generated by providing a training set of data in relation to alerts, generating a model statistical analysis of said data, predefining at least two alert classes, and assigning predefined alert classes to the statistical analysis, based on information provided by a signature-based intrusion detection system, or by a human operator.

11 Claims, 4 Drawing Sheets

(56) References Cited

U.S. PATENT DOCUMENTS

| | | | |
|---|---|---|---|
| 7,185,368 B2* | 2/2007 | Copeland, III | 726/25 |
| 7,594,009 B2* | 9/2009 | Triulzi et al. | 709/224 |
| 7,639,714 B2* | 12/2009 | Stolfo et al. | 370/474 |
| 8,108,931 B1* | 1/2012 | Witten et al. | 726/23 |
| 8,171,554 B2* | 5/2012 | Elovici et al. | 726/24 |
| 8,205,259 B2* | 6/2012 | Stute | 726/23 |
| 8,601,564 B2* | 12/2013 | Wahl et al. | 726/11 |
| 2005/0060295 A1* | 3/2005 | Gould et al. | 707/3 |
| 2007/0118905 A1* | 5/2007 | Morin et al. | 726/23 |
| 2007/0150954 A1* | 6/2007 | Shon | 726/23 |
| 2007/0169194 A1* | 7/2007 | Church et al. | 726/23 |
| 2007/0240207 A1* | 10/2007 | Belakhdar et al. | 726/12 |
| 2009/0193293 A1* | 7/2009 | Stolfo et al. | 714/26 |
| 2009/0234899 A1* | 9/2009 | Kramer | 708/200 |

OTHER PUBLICATIONS

Using Adaptive Alert Classification to Reduce False Positives in Intrusion Detection; Tadeusz Pietraszek; E. Jonsson et al. (Eds.): RAID 2004, LNCS 3224, pp. 102-124, 2004. Springer-Verlag Berlin Heidelberg 2004.*

Utilizing Statistical Characteristics of N-grams for Intrusion Detection; Li Zhuowei et al.; Proceedings of the 2003 International Conference on Cyberworlds (CW'03); IEEE; 2003.*

Anomalous Payload-Based Network Intrusion Detection; Ke Wang et al.; RAID 2004, LNCS 3224, pp. 203-222, 2004.*

BotHunter: Detecting Malware Infection Through IDS-Driven Dialog Correlation; Guofei Gu et al.; 16th USENIX Security Symposium; pp. 167-182; Jul. 6, 2007.*

International Search Report for PCT/NL2010/000060, mailed Jun. 22, 2010.

NL Search Report for NL2002694 dated Nov. 13, 2009.

* cited by examiner

METHOD AND SYSTEM FOR ALERT CLASSIFICATION IN A COMPUTER NETWORK

CROSS-REFERENCE TO RELATED APPLICATIONS

This application is the National Stage of International Application No. PCT/NL2010/000060, filed Mar. 31, 2010, which claims the benefit of Netherlands Application No. 2002694, filed Apr. 1, 2009, and U.S. Provisional Application No. 61/165,565, the contents of which are each incorporated by reference herein.

FIELD OF THE INVENTION

The present invention relates to a method and a system for classifying intrusion alerts in a computer network.

BACKGROUND OF THE INVENTION

Network intrusion detection systems (NIDS) are considered an effective defence against network-based attacks directed at computer systems and are employed in almost all large-scale IT infrastructures, due to the increasing severity and likelihood of such attacks. There are two main types of intrusion detection systems: signature-based and anomaly-based intrusion detection systems.

A signature-based intrusion detection systems (SBS) relies on pattern-matching techniques. The system contains a database of signatures, i.e. sequences of data, that are known from attacks of the past. These signatures are matched against the analyzed data. When a match is found, an alarm is raised. The database of signatures needs to be updated by experts after a new attack has been identified.

Differently, an anomaly-based intrusion detection systems (ABS) first build a statistical model describing the normal network traffic. The system then analyses data and flags any traffic or action that significantly deviates from the model, as an attack. The advantage of an anomaly-based system is that it can detect zero-day attacks, i.e. attacks that not yet have been identified as such by experts.

An SBS can detect not only when there is an attack, but can also classify the attack and provide information about the attack, since this information is usually provided in the database. An attack classification may identify the attack context with respect to the vulnerability exploited and the target. Typical examples of attack classifications are: buffer overflow, SQL Injection, Cross-site Scripting, path traversal, port scan and service fingerprinting.

These high-level classifications are often used by security teams to choose an appropriate counter measure policy or action, since attacks of a certain attack class may be more harmful than others. For instance, if a buffer overflow class alert is raised, the policy may be that the system will immediately deny any further communication to a certain IP, while in case of a port scan class alert, the system may wait for further action to take place.

An ABS generates and provides an attack alert when the currently analysed traffic data is too different from the model of normal traffic. Security teams have to manually inspect each alert raised by the ABS to choose an appropriate counter measure policy or action, which results in a workload for the security team members. Several systems have been proposed to lower the workload for the security team members when alerts are raised by an ABS.

The US patent application US2007/0118905 describes a method for automatically classifying a set of alarms on the basis of specific trellis of the alerts. The specific trellis are merged into general trellis. Collated alerts are identified by selecting the alerts that are simultaneously the most pertinent and the most general. The collated alerts are supplied to an output unit of an alert management system.

In an article by W. Robertson et al., "Using generalisation and characterization techniques in the anomaly-based detection of web attacks" (conference proceeding NDSS symposium 2006), an anomaly based detection system of web-based attacks is disclosed. The system uses an anomaly generalization technique that automatically translates suspicious web requests into anomaly signatures. These signatures are then used to group recurrent or similar anomalous requests so that an administrator can easily deal with a large number of similar alerts. The grouping of signatures is done using ad hoc heuristics.

SUMMARY OF THE INVENTION

An objective of the present invention is to provide an other method and system for classification of intrusion alerts. This objective is achieved by providing a method for classifying intrusion alerts in a computer network, comprising the steps of monitoring traffic data in a computer network, detecting an occurrence of an intrusion from the monitored traffic data, providing in response to the detection of the occurrence of the intrusion, an intrusion alert and data in relation to the intrusion alert, generating a statistical analysis of the data in relation to the intrusion alert, and classifying the intrusion alert based on said statistical analysis.

An advantage of classifying intrusion alerts based on statistical analysis of the data in relation to the intrusion alerts may be that it provides a reliable method for classifying alerts which can be automated. Members of a security team need not to review all alerts and can choose an appropriate counter measure policy based on the classification. It may also enable that the policy is applied automatically on the basis of the classification.

In another embodiment, the second step of the method comprises detecting an anomaly on a basis of said monitoring and a model describing normal traffic data in a computer network.

An advantage of generating an intrusion alert when an anomaly has been detected may be that it doesn't require that the intrusion has to be identified once before for generating an intrusion alert. A yet unknown intrusion will also be detected when its activities result in deviation of the normal network traffic.

In a further embodiment of the invention, the data in relation to an intrusion alert comprises at least one payload of the traffic data that caused the intrusion alert. When an anomaly-based intrusion detection system raises an alert, the provided data may be a copy of the traffic data that has been identified as significantly deviating from a model that represents normal traffic data. The data in relation to the alert may also comprise other data collected or provided by the anomaly-based intrusion detection system.

In a further embodiment of the invention, generating a statistical analysis of the data in relation to the intrusion alert comprises generating information about a statistical distribution of n-grams in at least a part of the data in relation to the intrusion alert. An n-gram analysis is a sequence of n-units, with n being an integer. The unit can be a byte, a bit or another sequence of characters. In an embodiment of the invention the n-grams are sequences of bytes. In a further embodiment the information is about whether a certain n-gram has occurred in the data or/and the frequency of the occurrences. An advantage of generating this information may be that it provides an accurate profile of the data in relation to the alert and that it can easily be generated and compared with a model.

In an embodiment of the invention generating a the statistical analysis of the data in relation to the intrusion alert comprises applying a bloom filter on the statistical distribution of n-grams or storing the statistical distribution of n-grams in bitmap data structures. An advantage of applying a bloom filter or storing information in bitmap data structures may be that it enables efficient storage.

In another embodiment of the invention, classifying the intrusion alert comprises comparing at least a part of the statistical analysis with at least a part of a model of intrusion alerts with predefined alert classes and assigning one of the predefined alert classes to the intrusion alert based on the comparison. In a further embodiment, the model of intrusion alerts with predefined alert classes is generated before detecting an occurrence of an intrusion. An advantage of using a model for classifying the alerts may be that it enables automatic comparison of alerts generated by the ABS and known alerts, which have already been classified.

In another embodiment of the invention, generating a model of intrusion alerts with predefined alert classes comprises the steps of providing a training set of data in relation to intrusion alerts, generating a statistical analysis of said training set of data, predefining at least two alert classes, and assigning predefined alert classes to one or more parts of said statistical analysis, based on information provided by a signature-based intrusion detection system, or by a human operator and constructing a model of intrusion alerts comprising one or more parts of said statistical analysis and hereto assigned predefined alert classes. The training set may also comprise the traffic data with the known intrusion attacks. The data in relation to the alerts may then be generated by an ABS.

An advantage of this method of generating a model may be that it enables automatic generation of the model with only providing a training set and a appropriate classification.

In a further embodiment of the invention, the step of comparing at least a part of the statistical analysis with at least a part of the model of intrusion alerts with predefined alert classes, comprises using a machine learning technique, such as a neural network, a support vector machine, decision trees or a combination of them. It may be advantageous to use a machine learning technique as it enables automatic profiling of the data in relation to the alerts and automatic comparison.

In yet another embodiment the intrusion alerts are classified in a "false" class or a "true" class. It may be advantageous to classify the data in relation to the alert as being a true or a false alert, in order to limit the number of alerts generated by the ABS that are not related to an attack.

According to the invention a system is provided to perform the method described above in order to classify intrusion alerts. The system for classifying intrusion alerts in a computer network comprises an intrusion detection system arranged for monitoring traffic data in the computer network, for detecting an occurrence of an intrusion from the monitored traffic data and for providing in response to the detection of the occurrence of the intrusion, an intrusion alert and data in relation to the intrusion alert, an alert information extractor arranged for generating a statistical analysis of the data in relation to the intrusion alert, and an alert classification engine arranged for classifying the intrusion alert based on said statistical analysis.

In another embodiment of the invention, the intrusion detection system further comprises a traffic data monitor for monitoring traffic data in a computer network, an anomaly detector for detecting an anomaly on a basis of said monitoring and a model describing normal traffic data in a computer network, and an alert generator for providing in response to the detection of anomaly, an intrusion alert and for providing data in relation to the intrusion alert.

BRIEF DESCRIPTION OF THE DRAWINGS

Further advantageous embodiments of the assembly according to the invention are described in the claims and in the following description with reference to the drawing, in which:

DETAILED DESCRIPTION OF THE INVENTION

Figure 1:
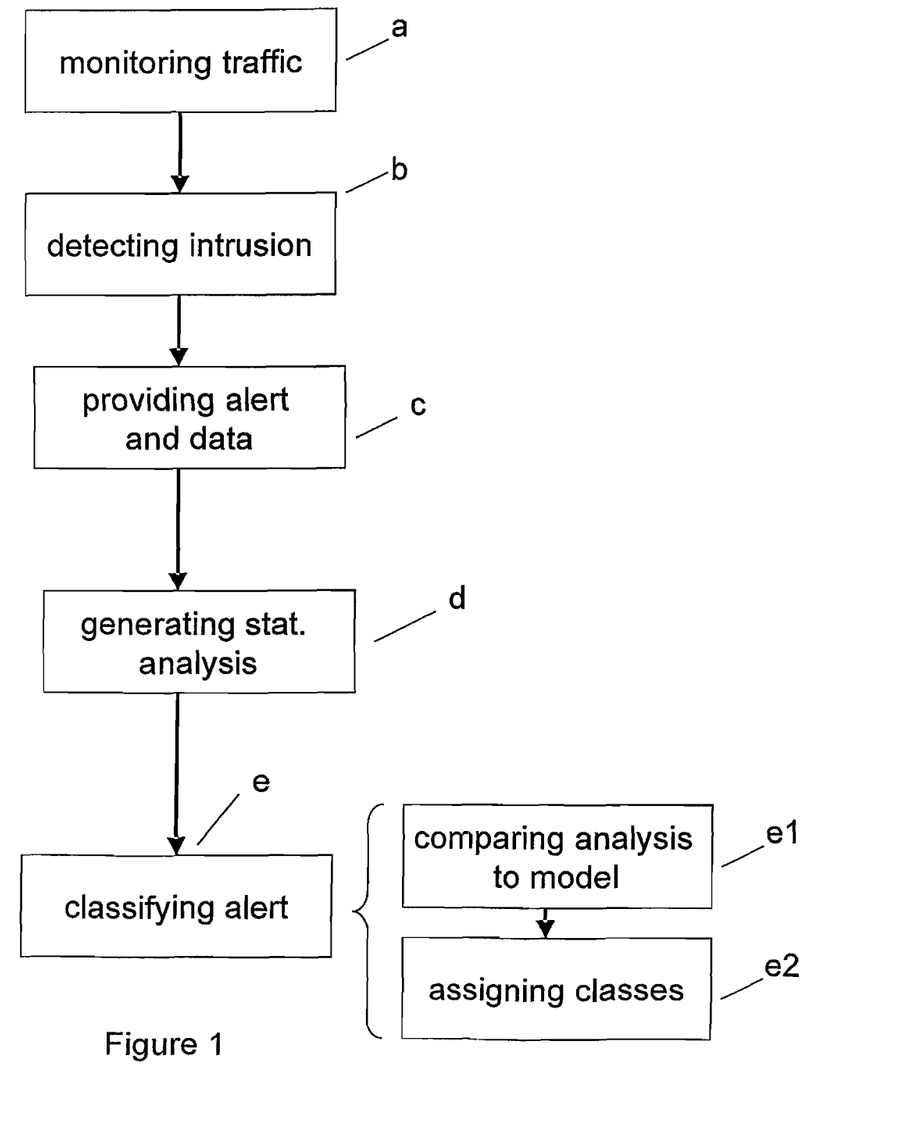
FIG. 1 depicts a flow diagram of a process for classifying intrusion alerts in a computer network, illustrative for some embodiments according to the invention, in a working mode.

In FIG. 1 a flow diagram of a process for classifying intrusion alerts in a computer network, illustrative for some embodiments according to the invention is shown in a working mode. In the working mode, a model of intrusion alerts with predefined alert classes is present and has already been generated. The generation of the model is described further below. In the working mode, classification of an intrusion alert will start by monitoring traffic data in a computer network, step a in FIG. 1.

Next step is detecting an occurrence of an intrusion from the monitored traffic data (step b). Detecting an intrusion may be achieved by an anomaly-based intrusion detection system or by any other intrusion detection system. In FIG. 1, steps a, b, c, are normally performed by an anomaly-based intrusion detection system. Detection of an anomaly (step b) then implies that traffic data has been identified as deviating significantly from normal network traffic data. Then an alert and data in relation to the alert will be provided (step c).

The data in relation to the intrusion alert may comprise the attack payload that had triggered the (anomaly-based) intrusion detection system to generate the alert or it may be data representative of this payload.

The next step, step d in FIG. 1, is generating a statistical analysis of the data in relation to the alert, which will be the basis of the classification. The generation of the statistical analysis may be accomplished by an alert information extractor (AIE). The analysis should incorporate enough features from the original data to distinguish alerts belonging to different classes. Furthermore, the analysis should be efficient with respect to the required resources of the alert information extractor. For example, if the generating of the statistical analysis requires too much memory space or/and computing power, the alert information extractor may be become too slow or too resource consuming.

According to an embodiment of the invention, the generation of the statistical analysis is achieved using n-gram analysis. N-gram analysis is a technique used to profile for example the payload content by marking the occurrence (and, additionally, the frequency) of n-grams, where n-grams may be sequence of n bytes. For example, a 1-gram analysis can be used, where average byte frequency and standard deviation values of payloads are stored. It is also possible to use higher order n-grams, i.e., n-grams where n>1. The memory space needed to store average and standard deviation values for each n-gram grows exponentially (e.g., 640 GB would be needed to store 5-grams statistics). Another possibility is to store the fact that a certain n-gram has occurred, rather than computing average byte frequency and standard deviation statistics. This may be advantageous because high-order n-grams are more sparse than low-order n-grams, thus it is more difficult to gather accurate statistics (i.e., with a sufficient number of samples) as the order increases. Another advantage may be that it requires less space in memory.

The amount of data resulting from the statistical analysis can be stored in different ways, for example using a bitmap data structure. Another way of storing the data compactly is applying a Bloom filter on the data. A Bloom filter yields a bit array of m bits, where m can be any integer number. Like a bitmap, it stores binary information.

The step of classifying the intrusion alerts based on the statistical analysis, step e, may comprise two steps, i.e. comparing at least a part of the statistical analysis with at least a part of a model of intrusion alerts with predefined alert classes (step e1) and assigning one of the predefined alert classes to the intrusion alert based on the comparison (step e2).

Figure 2:
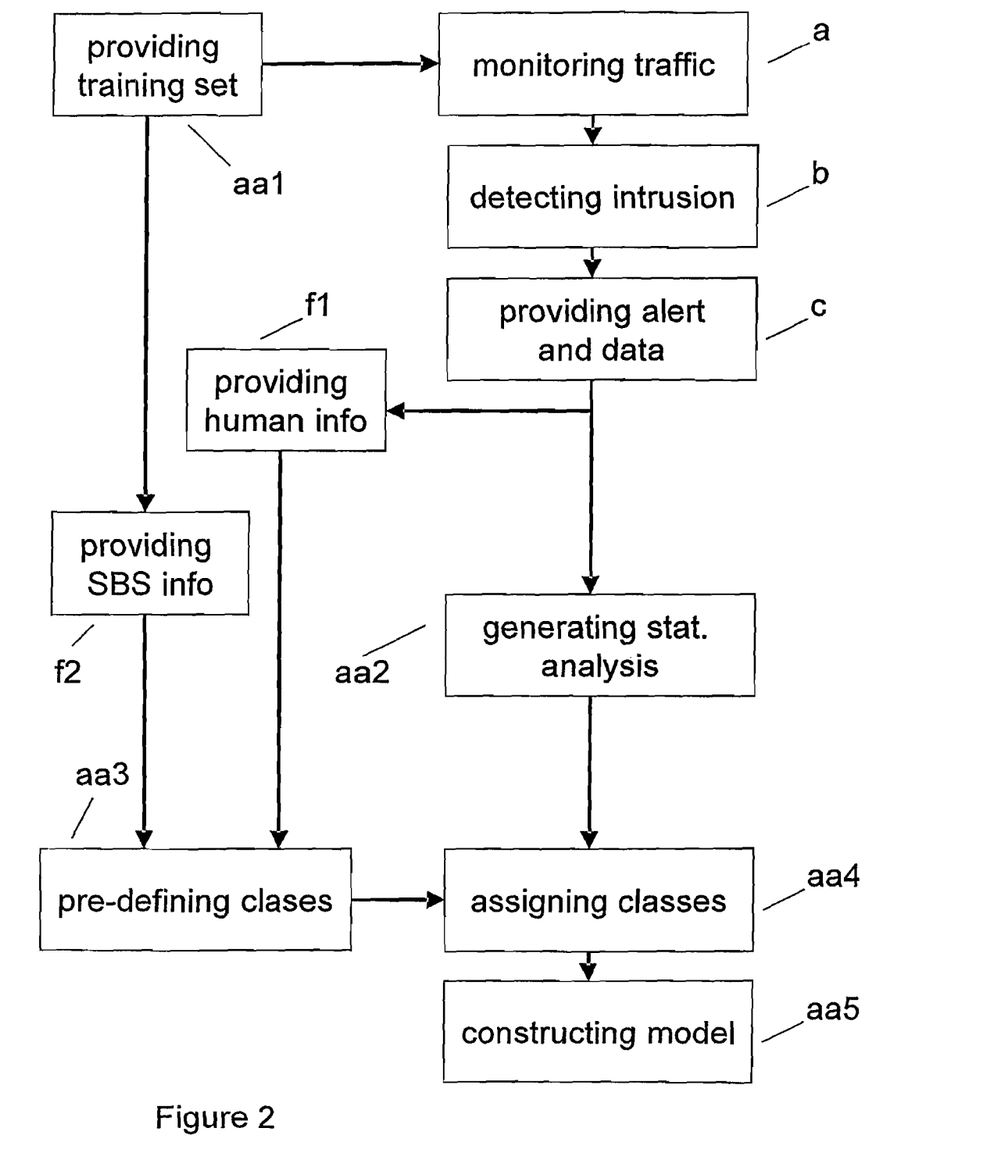
FIG. 2 depicts a flow diagram of a process for classifying intrusion alerts in a computer network, illustrative for some embodiments according to the invention, in a training mode.

To understand the content of the model of intrusion alerts with predefined alert classes, the generating the model is discussed first. In FIG. 2, a flow diagram of a for classifying intrusion alerts in a computer network, illustrative for some embodiments according to the invention is depicted in a training mode. In the training mode the model of intrusion alerts with predefined alert classes is generated.

First, a training set of is provided. This data can be delivered directly to the process of generating a statistical analysis when it contains the required data in relation to the alerts. However, it is also possible to provide a training set of traffic data to an anomaly-based intrusion system. This is shown in FIG. 2 in step aa1. The anomaly-based intrusion system may then monitor the traffic data (step a), detect an intrusion (step b), provide an alert and data in relation to the alert (step c) to the alert information extractor. In this way the data in relation to the alert is automatically generated.

Just as in working mode, a statistical analysis of the data in relation to the alert is generated (step aa2). The statistical analysis will be matched with one or more classes (step aa3). These classes of intrusion alerts have been predefined (step aa3). A machine learning technique may be used for identifying the classes in the statistical analysis of data in relation to the intrusion alerts. Since the alert classes, the alerts, and the data related to such alerts are well known, classes can be assigned to the statistical analysis. Then a model of intrusion alerts with predefined alert classes can be constructed (aa5). The model serves as a reference when classifying intrusion alerts in the working mode.

The predefined classes are identified either on the basis of a signature based intrusion detection system (step f2) and/or by a human operator (step f1). In case a signature-based intrusion detection system is used, it has to monitor the same training set of traffic data. The signature-based intrusion detection may identify attacks in the training set of traffic data, raise alerts, and also identify the classes of the attacks which caused the alerts. The work load for the security team members may be low, but the classification accuracy may also be low.

Another possibility is that a human operator classifies the alerts raised by the anomaly-based intrusion detection system. Although this requires human intervention, it may produce better results, since each alert is consistently classified. A combination of two methods is also possible, when the human operator may classify the alerts in a consistent manner with the signature-based intrusion detection.

In the working mode, the model of intrusion alerts with predefined alert classes is used to classify the alerts. This may be executed by the so called alert classification engine. The statistical analysis of the data in relation to the alert is compared with the model (FIG. 1, step e1) and on the basis of the comparison, one of the predefined alert classes is assigned to the intrusion alert (step e2). Any supervised machine learning technique, such as a neural network, a support vector machine or decision trees, may be used for this.

In another embodiment of the invention, the alert classification engine may assign all alerts to either a "false" class or a "true" class. It may be advantageous to use the invention to distinguish true attacks from false attacks.

Figure 3:
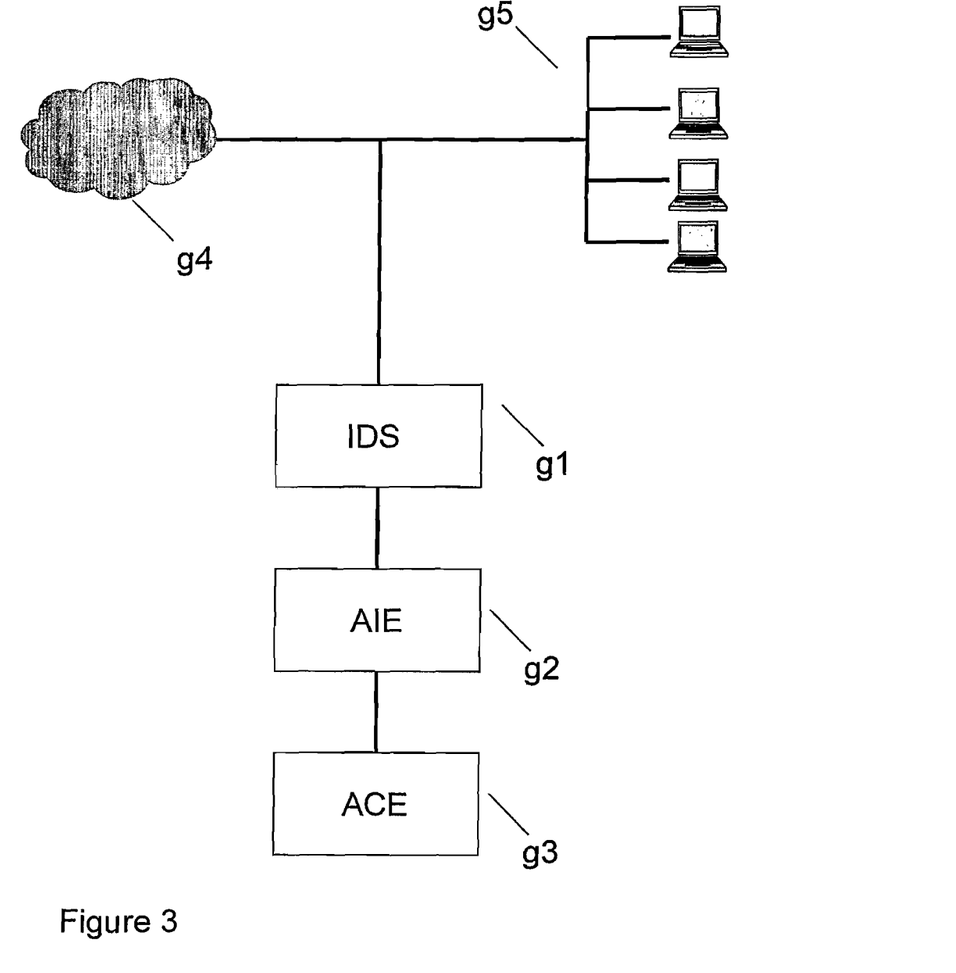
FIG. 3 depicts a highly schematic diagram of a system for classifying intrusion alerts in a computer network, illustrative for some embodiments according to the invention, in a working mode.

In FIG. 3, a highly schematic diagram of a system for classifying intrusion alerts in a computer network, illustrative for some embodiments according to the invention is depicted in a working mode. It depicts an intrusion detection system (IDS) g1, which may monitor traffic data between an (external) network g4, for example the internet, and a network that has to be protected against attacks, such as LAN network g5. It further depicts an alert information extractor (AIE) g2 that is arranged for executing the steps d and aa2 as mentioned above. The data in relation to the alert may, according to an embodiment of the invention, be provided by an anomaly-based intrusion detection system e3, arranged for executing steps a and a, b and c as described above.

The statistical analysis of the data in relation to the alert is provided by the alert information extractor (AIE) g2 to the alert classification engine (ACE) g3. The alert classification engine is arranged to execute steps e, e1, e2 and aa4, aa5 as mentioned above.

Figure 4:
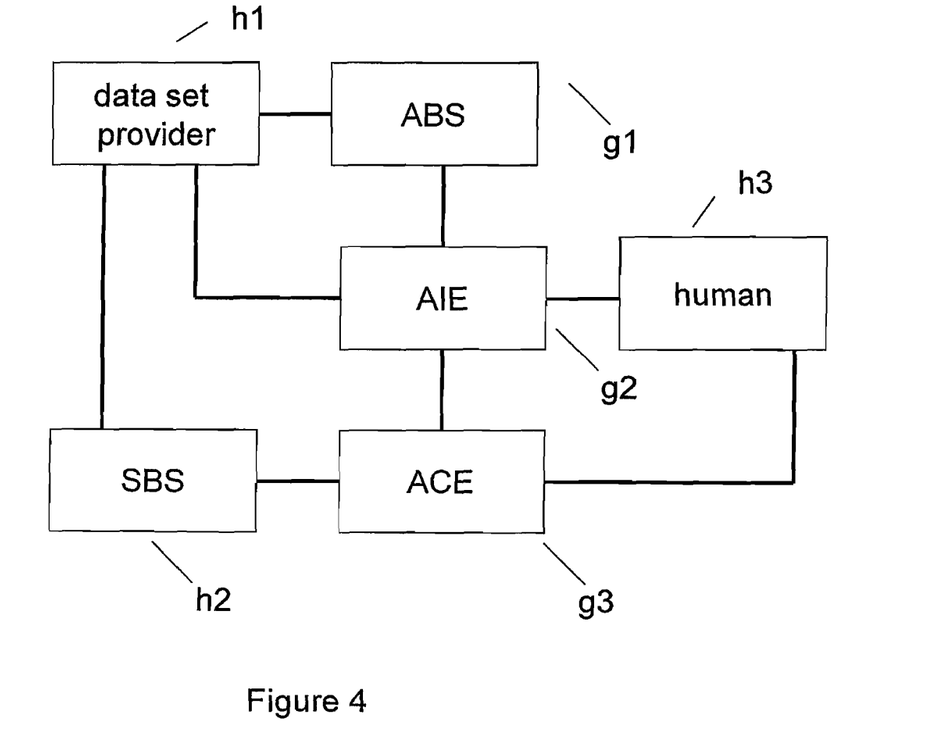
FIG. 4 depicts a highly schematic diagram of a system for classifying intrusion alerts in a computer network, illustrative for some embodiments according to the invention, in a training mode.

In FIG. 4 a highly schematic diagram of a system for classifying intrusion alerts in a computer network, illustrative for some embodiments according to the invention is depicted in a training mode. A data set provider h1 is arranged to execute step aa1 as mentioned above or to provide data in relation to the alerts directly to the AIE, g2. Also a signature-based intrusion detection system h2 and a human operator h3 are shown and arranged to executed the steps that are described above.

Referring to the preceding explanation of the invention, it is noted that further modifications and embodiments are very well conceivable. Also further modifications and embodiments are within the scope of this invention.

The invention claimed is:

1. A method for classifying intrusion alerts in a computer network, the method comprising:
   a) monitoring traffic data in a computer network;
   b) detecting an occurrence of an intrusion from the monitored traffic data;
   c) providing an intrusion alert and data in relation to the intrusion alert in response to the detection of the occurrence of the intrusion;
   d) generating a statistical analysis of the data in relation to the intrusion alert, the data in relation to the intrusion alert as provided in response to the detection of the occurrence of the intrusion; and e) classifying the intrusion alert as provided in the response to the detection of the occurrence of the intrusion, based on said statistical analysis of the data in relation to the intrusion alert, the classifying the intrusion alert providing an attack classification that identifies a context of the detected intrusion with respect to a vulnerability exploited and a target, wherein generating said statistical analysis of the data in relation to the intrusion alert comprises generating information about a statistical distribution of n-grams using an n-gram analysis in at least a part of the data in relation to the intrusion alert, when n=1, the n-gram analysis being a 1-gram analysis, storing average byte frequency and standard deviation values, and when n>1 a fact is stored that a certain n-gram of the n-grams occurred without storing the average byte frequency and standard deviation values, wherein generating the statistical analysis of the data in relation to the intrusion alert comprises applying a bloom filter on the statistical distribution of n-grams or storing the statistical distribution of n-grams in bitmap data structures, and wherein classifying the intrusion alert based on said statistical analysis comprises:

e1) comparing at least a part of the statistical analysis, the statistical analysis comprising the statistical distribution of the n-grams, with at least a part of a model of intrusion alerts with predefined alert classes, using a machine learning technique; and e2) assigning one of the predefined alert classes to the intrusion alert based on the comparison, thereby providing the attack classification that identifies the context of the detected intrusion with respect to the vulnerability exploited and the target.

2. The method according to claim 1, wherein detecting the occurrence of the intrusion from the monitored traffic data comprises:

b1) detecting an anomaly on a basis of said monitoring and a model describing normal traffic data in the computer network.

3. The method according to claim 1, wherein the data in relation to the intrusion alert comprises at least one payload of the traffic data that caused the intrusion alert.

4. The method according to claim 1, wherein the n-grams are sequences of bytes.

5. The method according to claim 1, wherein detecting the occurrence of the intrusion from the monitored traffic data comprises generating information about byte frequency in at least the part of the data in relation to the intrusion alert.

6. The method according to claim 1, further comprising: before a) monitoring traffic data in the computer network, aa) generating the model of intrusion alerts with predefined alert classes.

7. The method according to claim 6, wherein generating the model of intrusion alerts with predefined alert classes comprises:

aa1) providing a training set of data in relation to intrusion alerts;

aa2) generating a statistical analysis of said training set of data;

aa3) predefining at least two alert classes;

aa4) assigning predefined alert classes to one or more parts of said statistical analysis, based on information provided by one or more of a signature-based intrusion detection system, and a human operator; and aa5) constructing the model of intrusion alerts comprising one or more parts of said statistical analysis and respective assigned predefined alert classes.

8. The method according to claim 1, wherein the machine learning technique comprises one or more of a neural network, a support vector machine, and decision trees.

9. The method according to claim 1, wherein the intrusion alert is classified in one of a "false" class or a "true" class.

10. A system for classifying intrusion alerts in a computer network, the system comprising:

an intrusion detection system configured and operative for monitoring traffic data in the computer network, for detecting an occurrence of an intrusion from the monitored traffic data and for providing in response to the detection of the occurrence of the intrusion, an intrusion alert and data in relation to the intrusion alert the data in relation to the intrusion alert as provided by the intrusion detection system in response to the detection of the occurrence of the intrusion, an alert information extractor configured and operative for generating a statistical analysis of the data in relation to the intrusion alert; and an alert classification engine configured and operative for classifying the intrusion alert as provided by the intrusion detection system in response to the detection of the occurrence of the intrusion based on said statistical analysis of the data in relation to the intrusion alert as generated by the alert information extractor, the classifying the intrusion alert providing an attack classification that identifies a context of the detected intrusion with respect to a vulnerability exploited and a target, wherein the alert information extractor is further configured to generate information about a statistical distribution of n-grams using an n-gram analysis in at least a part of the data in relation to the intrusion alert, when n=1, the n-gram analysis being a 1-gram analysis, storing average byte frequency and standard deviation values, and when n>1 a fact is stored that a certain n-gram of the n-grams occurred without storing the average byte frequency and standard deviation values, wherein generating the statistical analysis of the data in relation to the intrusion alert comprises applying a bloom filter on the statistical distribution of n-grams or storing the statistical distribution of n-grams in bitmap data structures, and wherein the alert classification engine is further configured to:

compare at least a part of the statistical analysis, the statistical analysis comprising the statistical distribution of the n-grams, with at least a part of a model of intrusion alerts with predefined alert comprising the statistical distribution of the n-grams, with at least the part of a model of intrusion alerts with predefined alert classes, using a machine learning technique; and assign one of the predefined alert classes to the intrusion alert based on the comparison, thereby providing the attack classification that identifies the context of the detected intrusion with respect to the vulnerability exploited and the target.

11. The system according to claim 10, wherein the intrusion detection system further comprises:

a traffic data monitor engine configured and operative for monitoring traffic data in the computer network;

an anomaly detector configured and operative for detecting an anomaly on a basis of said traffic data monitoring engine and a model describing normal traffic data in the computer network; and an alert generator transmitter configured and operative for providing an intrusion alert in response to the detection of anomaly, and for providing data in relation to the intrusion alert.

\* \* \* \* \*